United States Patent
Shiff et al.

(10) Patent No.: US 8,000,649 B2
(45) Date of Patent: Aug. 16, 2011

(54) SYSTEM AND METHOD FOR THE REDUCTION OF INTERFERENCE IN AN INDOOR COMMUNICATIONS WIRELESS DISTRIBUTION SYSTEM

(76) Inventors: Yoni Shiff, Rishon Lezion (IL); Yirmi Hauptman, Rishon Lezion (IL); Marc Seelenfreund, Ra'anana (IL)

( * ) Notice: Subject to any disclaimer, the term of this patent is extended or adjusted under 35 U.S.C. 154(b) by 1043 days.

(21) Appl. No.: 10/576,795

(22) PCT Filed: Oct. 23, 2003

(86) PCT No.: PCT/IL03/00863
§ 371 (c)(1),
(2), (4) Date: Apr. 21, 2006

(87) PCT Pub. No.: WO2005/050855
PCT Pub. Date: Jun. 2, 2005

(65) Prior Publication Data
US 2007/0135042 A1 Jun. 14, 2007

(51) Int. Cl.
*H04B 7/15* (2006.01)
(52) U.S. Cl. ....... 455/11.1; 455/7; 455/63.1; 455/67.11; 455/78; 370/226; 370/243; 370/246
(58) Field of Classification Search ................. 455/63.1, 455/67.11, 67.13, 69, 78, 82, 570, 562.1, 455/114.2, 339, 245.1, 7, 11.1; 370/226, 370/243, 246, 293
See application file for complete search history.

(56) References Cited

U.S. PATENT DOCUMENTS

| | | | |
|---|---|---|---|
| 4,750,036 A | 6/1988 | Martinez | |
| 4,878,729 A * | 11/1989 | Stewart | 385/18 |
| 6,934,511 B1 * | 8/2005 | Lovinggood et al. | 455/11.1 |
| 6,970,680 B1 * | 11/2005 | Tomoe | 455/63.3 |
| 7,054,301 B1 * | 5/2006 | Sousa et al. | 370/343 |
| 2002/0039415 A1 * | 4/2002 | Schulz et al. | 379/406.01 |
| 2003/0021367 A1 * | 1/2003 | Smith | 375/346 |
| 2004/0054471 A1 | 3/2004 | Bartlett et al. | |
| 2004/0058645 A1 | 3/2004 | Brenner | |
| 2005/0003763 A1 * | 1/2005 | Lastinger et al. | 455/63.1 |

FOREIGN PATENT DOCUMENTS
| | | | |
|---|---|---|---|
| JP | 02001168812 A | * | 6/2001 |
| WO | WO 03/013025 | * | 2/2003 |

* cited by examiner

*Primary Examiner* — Tuan A Pham
(74) *Attorney, Agent, or Firm* — Soroker-Agmon (57) ABSTRACT

An apparatus and its corresponding method for detecting and reducing interference elements within an indoor communication wireless system by dynamically locating the source of the interference, and by preventing the distribution of the interference via controlled attenuation of the interfering signal. The apparatus and method dynamically controls (44) the potential interference sources by optionally switching off (39) or attenuating (38) the antennas generating the signal carrying interference elements. Further, the proposed apparatus and method is operative in the reconnection of switch off (39) antennas and/or the controlled (44) restoration of the signal strengths where the interference diminishes.

29 Claims, 6 Drawing Sheets

SYSTEM AND METHOD FOR THE REDUCTION OF INTERFERENCE IN AN INDOOR COMMUNICATIONS WIRELESS DISTRIBUTION SYSTEM

BACKGROUND OF THE INVENTION

1. Field of the Invention

The present invention relates to indoor communications wireless distribution systems in general, and more particularly to interference reduction in an indoor communications wireless distribution system.

2. Discussion of the Related Art

Recently, the indoor deployment of wireless antenna networks, such as cellular networks or wireless LAN networks, is increasingly becoming a widespread phenomenon in the world of communications. Such wireless antenna networks are specifically deployed in large man-made structures such as multi-store office buildings, large shopping malls, parking garages (both underground and above ground), apartment buildings, residential homes, and distant structures. The indoor deployment provides for the operation of a wireless distribution system for areas that either lack signal or lack the required signal strength for adequate sufficient communication performance. The objectives of an indoor deployment regard both the provision of enhanced and extended wireless communications services to the subscribers of a communications network operating within large man-made structures where the network coverage is reduced or non-existent, and the increase of the capacity of the network in crowded areas where the number of potential service users is high, such as in entertainment centers, transportation hubs, hospital multi-buildings, university campuses, and commercial complexes.

Two conventional configurations are typically being used in order to provide extended or enhanced wireless coverage to structures having large indoor areas. The first configuration is characterized by the utilization of a repeater device and the service is provided by a donor site that is located in close proximity of the coverable structure. An external antenna is installed in the coverable structure at a suitable location. The external antenna receives and broadcasts signals from and to the external donor site. The external antenna is connected to one or more internal antennas installed within the internal space of the coverable structure via an bi-directional amplifier device. Thus, the downlink signals received from the external donor site by the external antenna are amplified and distributed within the internal space of the coverable structure to the internal antennas. The internal antennas broadcast the signals across the internal space of the coverable structure to the customer communication devices, such as s cellular phones. The uplink signals generated by the customer communication devices operating within the internal space of the coverable structure are received by the internal antennas, fed to the external antenna and broadcasted by the external antenna to the external donor site.

In the second type of configuration no use is made of a donor site. Instead, the donor site/external antenna is replaced by a fill Radio Base Station (RBS) that is installed in the coverable structure. The RBS consists of radio transmitter and a receiver that permit propagation of signals among wireless user devices (such as cellular phones) within the structure. The RBS is connected to a network of internally installed antennas within the internal space of the coverable structure via a bi-directional amplifier device in a manner similar to the first configuration.

In the typical configuration the wireless signals, such as cellular signals) are divided (split) among several inter-connected internally installed antennas. The inter-connected internal antennas are coupled to the repeater device or the Radio Base Station (RBS) via RF cables or optical fibers. As a result of the inter-connectedness, if one or more of the internal antennas receive a noisy signal, such as, for example, an interference generated by specific electronic components or by specific computing devices operating in the structure, the interfering signal may effect the disruption or the blocking of the reception of the signals from the entire set of the internal antennas. Such interferences are enhanced through the fact that the signals received from the antennas are summed together. Thus, an interference created by one antenna can block signals received from other antennas located within said structure. In addition, in the first deployment configuration in which the service is provided by a donor station and a repeater is installed in the structure, the interfering signals may be amplified and transmitted through the air interface to the donor station and thereby could generate a disruption or blockage of the wireless signals across a wider area.

Therefore, it would be easily perceived by one with ordinary skills in the art that a novel system and method is required in order to provide a substantial reduction in the distribution of local interferences, generated in micro-cell/pico-cell or network cells associated with a specific indoor deployment segment of a communication network where the interference is received by an antenna servicing a coverable structure, to the wider network. The reduction of the interference should provide the proper reception of suitably noise-free wireless signals from other associated antennas, and should prevent a situation in which the interference will disrupt and block the proper reception and transmission of the wireless signals across a wider area outside the internal space of the structure.

SUMMARY OF THE PRESENT INVENTION

One aspect of the present invention regards an apparatus deployed within an indoor communications wireless distribution system that is located within an internal space of a structure. The apparatus comprises the elements of: a radio base station or a repeater (bi-directional amplifier) device comprising an external antenna, a central control unit for detecting and reducing interference within the indoor network, an at least one antenna attenuation control unit for controlling the attenuation of an at least one internally installed antenna device, the at least one antenna attenuation control unit is associated with the central control unit, and an at least one internally installed antenna device for receiving and transmitting via the indoor air interface signal where the at least one internally installed antenna device is associated with the at least one antenna attenuation control.

A second aspect of the present invention regards a method for the detection of interference in the uplink wireless signal of an indoor communications wireless distribution system. The method comprises the steps of: determining the presence of interference in the wireless signal received from a set of antennas located within the indoor network determining whether an interference element is present in the wireless signal, selecting a first antenna from the set of antennas located within the indoor network; and attenuating the signal strength of the first antenna by an attenuation value.

A third aspect of the present invention regards an apparatus deployed within an indoor communications wireless distribution system located within an internal space of a structure, the apparatus comprising a radio base station or a repeater device comprising an external antenna and a bidirectional amplifier; a central control unit for detecting and reducing interference within the indoor wireless network; an at least one antenna attenuation control unit for controlling the attenuation of an at least one internally installed antenna device, the at least one antenna attenuation control unit is associated with the central control unit; an at least one internally installed antenna device for receiving and transmitting via the indoor air interface signal, the at least one internally installed antenna device is associated with the at least one antenna attenuation control. The repeater device is a bi-directional amplifier mini-repeater. The at least one internally installed antenna device is a multi-band vertical polarization indoor omni-directional antennas. The apparatus further comprising an at least one repeater attached to the at least one antenna attenuation control unit for enhancing the broadcast of the at least one internally installed antenna associated with the at least one antenna attenuation control unit. The central control unit detects the source antenna of the interference by sampling at least one uplink signal for the detection of interference. The detecting is accomplished by commanding the at least one antenna attenuation control to attenuate the signal strength received from the associated antennas. The the central control unit reduces or eliminates the interference by re-sampling the at least one uplink signal so as to reduce the level of interference to a value below a pre-determined interference threshold. The central control unit reduces or eliminates the interference by commanding the at least one antenna attenuation control to disconnect or lower the level of transmission of the associated at least one internally installed antenna device. The central control unit identifies the blocking of the transmission frequencies or an interference signal that is not a wireless signal by sampling the signal by a coupler device without interfering with the transferred signal. The central control unit samples the signal and identifies non-wireless signal generating interference. The central control unit issuing at least one command signal to the at least one antenna attenuation control unit for disconnecting or attenuating the at least one internally installed antenna device. The central control unit re-sampling the uplink signal for examining whether a detected interference is present or whether the strength of interference is above a pre-defined threshold. The at least one antenna attenuation control unit further comprising a bias tee or a DC Inserter comprises a capacitor and choke for receiving a signal and associated at least one control command embedded in the signal from the central control unit through a signal path and for further separating a power component from an RF component of the signal and feeding the power component to the power supply unit; a coupler for sampling the RF component without attenuating the signal; a band pass filter for attenuating the frequency range of the RF component while maintaining the frequency range of the at least one control command; a decoder for decoding the at least one control commands and feeding the gain controller with the at least one control command; a gain controller for controlling the operation of the RF attenuator, and; an RF attenuator for feeding the RF component to the at least one internally installed antenna device. The apparatus further comprising an RF switch for switching off and on the at least one internally installed antenna device. The at least one decoded control command is fed to the RF switch for instructing the switch to switch on or off the antenna. The RF attenuator responds to the gain controller output by attenuating the signal or by increasing the strength of the signal. The RF attenuator feeds a variable strength signal back to the bias tee which in turn feeds the RF signal back to the central control unit for re-sampling by the central control unit for the detection of interference. The apparatus further comprising a power supply unit for feeding power to the components of the at least one antenna attenuation control unit. The central control unit further comprises: a bias tee for inserting power into the signal transmitted to the at least one antenna attenuation control unit; a high pass filter comprising a frequency selective circuit for blocking the transmission of at least one control command to the external antenna; a coupler for sampling the signal without degrading the signal or attenuate the strength of the signal; a splitter unit for transmitting the at least one control command to the at least one antenna attenuation control unit and wireless signal to a band pass filter; a wireless band pass filter comprising a frequency selective circuit for filtering the wireless signal; an interference detector for detecting of interferences; an antenna attenuation control unit controller for receiving output from the interference detector and activating the at least one antenna attenuation control unit; and a control band pass filter comprising a frequency selective circuit for passing the at least one control command to the splitter unit for combining the at least one control command with the wireless signal. The apparatus further comprising a power supply fed by a power network and generating power for the operation of the central control unit and the at least one antenna attenuation control unit. The antenna attenuation control unit controller is installed within the radio base station for detecting interference in relation to a plurality of antennas or repeaters. The apparatus further comprises an interference detection unit for the detection of interferences in an uplink signal. The interference detection unit comprises: a at least one splitter unit for splitting an at least one signal into at least two similar signals; an envelope detector for performing spectral analysis on the at least two similar signals and comparing the interference envelope with a predetermined wireless signal form; at least one converter unit for converting the at least two similar signals from analogue to digital form, a down converter unit for converting the at least two similar signals into an intermediate frequency, a digital signal processor for processing the at least two similar signals in analog form, a central processor unit for processing the at least two similar signals in digital form and for sending an at least one control command to control the attenuation of the at least one internally installed antenna device. The apparatus further comprising: an intermediate frequency surface acoustic wave filter unit to spectral energy of a noise signal in a specific frequency band; at least one band width intermediate frequency band pass filter; and a multiplexer unit. The central processor unit recognizes an interference element in the uplink signal by examining the strength of the signal relative to a pre-determined interference threshold. The at least one converter is an analog-to-digital converter. The central processor unit recognizes an interference element in the uplink signal by examining the stability of the signal or the signal strength along a time axis. The central processor unit recognizes an interference element in the uplink signal by examining the spectral structure identified by the examination of the interference envelope at the extremities of the signal and the comparison of the detected envelope to the known structure of wireless signal. The central processor unit recognizes an interference element in the uplink signal by examining the power level of the signal across pre-defined time slots and the time slot intervals. The central processor unit recognizes an interference element in the uplink signal by examining the correlator of the base sequence of the control channel of the site. The central processor unit recognizes an interference element in the uplink signal by examining statistics of uplink levels of at least one previously made transmission, compared to actual uplink levels for detecting readings outside the base level determined over the time. The central processor unit recognizes an interference element in the uplink signal by examining the length of time between the start and ending of each interference signal detected. The at least one control command provides for the switching off or on of the at least one internally installed antenna device.

A fourth aspect of the present invention regards a method for the detection of an interference in the uplink wireless signal of an indoor communications wireless distribution system, the method comprising the steps of: determining the presence of interference in the wireless signal received from a set of antennas located within the indoor wireless network; determining whether an interference element is present in the wireless signal; selecting a first antenna from the set of antennas located within the indoor wireless network; and attenuating the signal strength of the first antenna by an attenuation value. The method further comprising the step of determining whether the attenuation of the signal strength from the first antenna was reduced by the attenuation value. The method further comprising the steps of: selecting a second antenna from the set of antennas located within the indoor wireless network; attenuating the signal strength of the second antenna by an attenuation value; determining whether the attenuation of the signal strength from the second antenna was reduced by the attenuation value. The method further comprising the step of attenuating the first or the second antenna until the interference falls below a pre-determined threshold. The method further comprising the step of switching off the first or second antenna to prevent the interference from extending across the indoor network. The first or the second antenna is an at least two antennas. The signal strengths received is attenuated by increasing or decreasing the first or second antenna signal strength by about 5-25 dB. The first or second antenna is the entire set of antennas constituting the indoor network. The method further comprising the step of is connecting all the antennas of an indoor wireless network. The step of attenuating the first or the second antenna includes the step of increasing or decreasing the antenna's signal strength. The method further comprising the step of determining whether following the attenuation of the signal strength from the first or the second antenna the interference appears within the signal. The method further comprising the step of repeatedly increasing the first or second antenna signal strength until the interference is detected or until a predetermined signal strength threshold is achieved. The method further comprising the step of reconnecting the switched off antennas or restoring a predetermined signal strength to the first or second antenna where the interference diminishes.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

An interference location and reduction system and method for an indoor communications wireless distribution system, such as a cellular network is disclosed. The invention discloses a central control unit programmed to locate and reduce interferences within the system. The system further includes an attenuator programmed to reduce and increase the level of transmission of an antenna within the wireless site thus enabling the detection and reduction of the interference within the wireless site. The attenuator is also designed to turn off and on each of the antennas so as to obtain the location and reduction of the interference within the wireless site.

Figure 1:
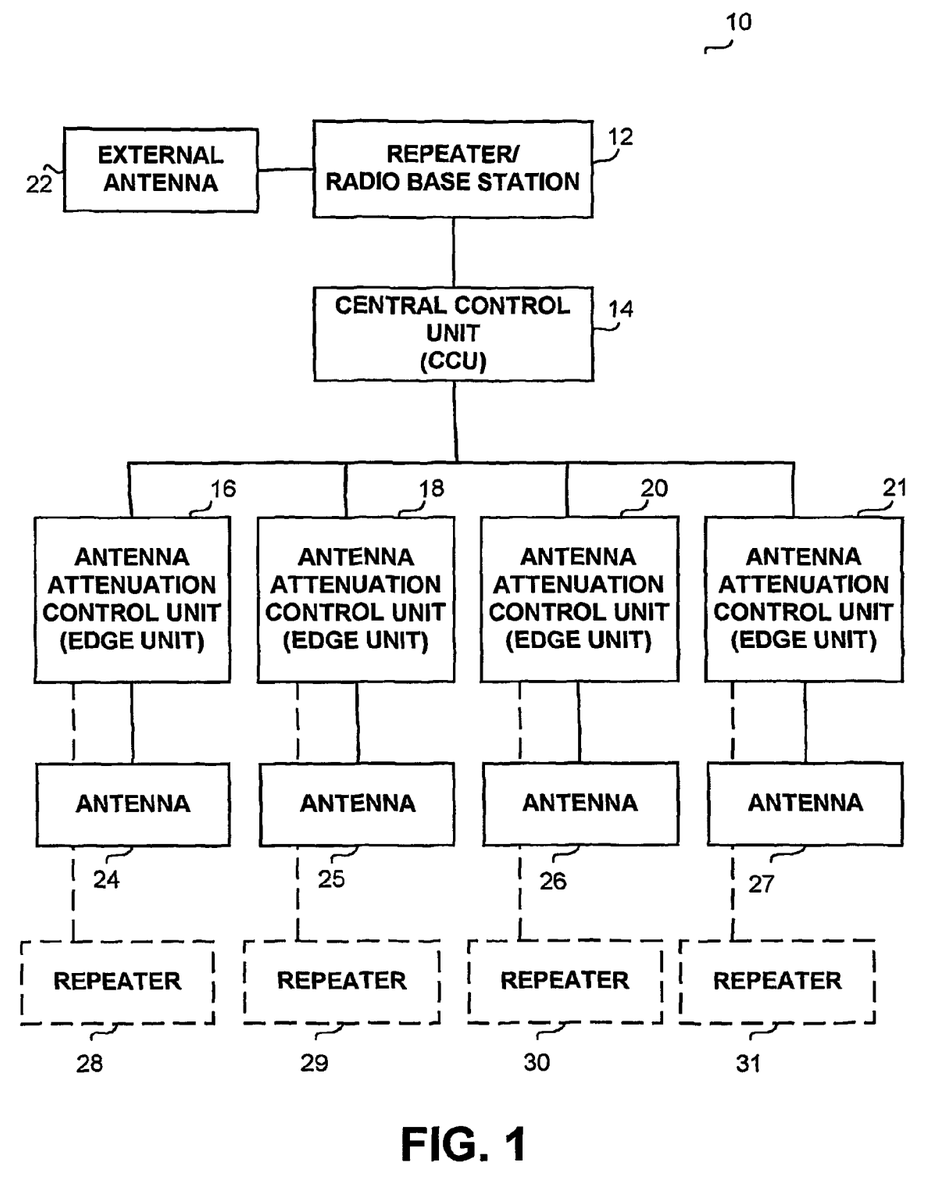
FIG. 1 is a schematic illustration of the system for interference detection and reduction, in accordance with a preferred embodiment of the present invention.

Referring now to FIG. 1, showing a schematic illustration of the system for interference detection and reduction, in accordance with a preferred embodiment of the present invention. In the preferred embodiment of the present invention, an interference reduction system 10 for an indoor communications wireless distribution system deployed in the internal space of a structure, consists of a Radio Base Station (RBS) or a repeater (bi-directional amplifier) device 12, a Central Control Unit (CCU) 14, a set of Antenna Attenuation Control (AAC) units 16, 18, 20, 21, and a set of internally installed antenna devices 24, 25, 26, 27 associated with the AAC units 16, 18, 20, and 21, respectively. One exemplary repeater device can be a mini-repeater which is a bi-directional amplifier manufactured by Cellvine of Or-Yehuda, Israel or alternatively a GSM Compact BDA 1 Watt Composite repeater manufactured by Dekolink of Petach Tikva, Israel and the like. Exemplary antennas to be used within the structure housing the wireless site can be a multi-band vertical polarization indoor omni-directional antennas such as Kathrein 741572 or 741571 manufactured by Kathrein-Werke KG of Rosenheim, Germany, and the like. The repeater device 12 consists of an externally installed antenna 22 and an associated bidirectional amplifier (not shown). Optionally, each AAC 16, 18, 20, 21 may also be attached to a repeater 28, 29, 30, 31 for enhancing the broadcast by each installed antenna devices 24, 25, 26, 27. In the downlink, wireless, such as cellular signals transmitted via an air interface from a wireless donor station (not shown) in the wider external wireless network, are received by the external antenna and fed to the amplifier unit. The downlink signals are amplified by the amplifier and fed to a Central Control Unit (CCU) 14. From the CCU 14 the downlink signals are suitably split and fed to several internally installed antennas 24, 25, 26, 27 via the Antenna Attenuation Control (AAC) units 16, 18, 20, 21, respectively. The downlink signals are transmitted by the antennas 24, 25, 26, 27 via an air interface within the structure to customer wireless communication devices, such as cellular phones (not shown) operating potentially within the internal space of the structure. Optionally, the downlink signals broadcast can be further enhanced by a repeater installed next to each antenna devices 24, 25, 26, 27 attached to each AAC 16, 18, 20, and 21. In the uplink RF signals generated in the customer wireless communication devices are transmitted via the internal air interface to a set of antennas 24, 25, 26, 27 internally installed within the structure. The uplink signals are received by the antennas 24, 25, 26, 27 and fed to the associated AAC units 16, 18, 20, 21. From the AAC units 16, 18, 20, 21 the uplink signals are combined and fed into the Central Control Unit (CCU) 14. From the CCU 14 the uplink signals are fed into the repeater unit 12. The uplink signals are amplified and fed via the externally mounted antenna 22, via the external air interface to the donor station in order to be received by the wider cellular network. Potential noise and resulting signal interference generated within the structure are received by the antennas 16, 18, 20, 21. The CCU 14 detects the source antenna of the interference by selectively and successively sampling the uplink signals for the detection of interference, by selectively and successively commanding the AAC units 16, 18, 20, 21 to attenuate the signal strength received from the associated antennas 24, 25, 26, 27, and by selectively and successively re-sampling the uplink signals until the level of interference is substantially reduced to a value below a pre-determined interference threshold. Where the level of interference is sufficiently high the CCU 14 could command the suitable AAC 16, 18, 20, 21 to disconnect or lower the level of transmission temporarily of the associated antenna 24, 25, 26, 27 to an acceptable level such that the interference is minimized or does not exist for as long as such interference exists. Following the recognition of the reduction or the cessation of the interference the CCU 14 commands the appropriate AAC 16, 18, 20, 21 to re-connect or restore the previous level of transmission of the associated antenna 24, 25, 26, 27 or to allow the strengthening of the uplink signal.

The CCU 14 is designed to identify the blocking of the transmission frequencies or an interference signals which are not the appropriate communication signals (such as a cellular, WLL etc.). The CCU 14 samples the cellular signals by a coupler device without interfering nor attenuating with the transferred signal. The CCU 14 further provides power to remote units via an RF capacitor.

Each indoor antenna 24, 25, 26, 27 is preferably associated with an AAC (edge) element 16, 18, 20, 21 that provides the option of disconnecting the antenna or attenuating the signals transmitted by the antenna. The CCU 14 and the AAC (edge) units 16, 18, 20, 21 are linked through a deployed RF or other communication cable. The low frequency modulated signals are transferred through the RF or other like cable. On the same cable power is supplied for the operation of the AAC (edge) units 16, 18, 20, 21. During the regular operation of the system the CCU 14 and the AAC (edge) units 16, 18, 20, 21 pass the wireless signals without degradation or attenuation. The CCU 14 samples the signals and attempts to identify inteference signals that could potentially generate interference to the communication channel. When via the sampling process an interference is detected by the CCU 14, the CCU 14 initiates a set of identical control command signals that are sent in an orderly and successive manner to the AAC (edge) units 16, 18, 20, 21 where the order of the control command signals is in accordance with the pre-defined identification of the AAC (edge) units 16, 18, 20, 21. When a specific AAC (edge) unit 16, 18, 20, 21 recognizes a control command signal sent by the CCU 14 the AAC (edge) unit 16, 18, 20, 21 responds to the control command by either disconnecting the associated antenna 24, 25, 26, 27, or by gradually attenuating the cellular signal in the uplink. Consequently the AAC (edge) unit 16, 1, 8, 20, 21 confirms the reception of the control command by sending a confirmation signal back to the CCU 14. Consequent to the reception of the confirmation signal, the CCU 14 responds to the confirmation by re-sampling the uplink signal in order to examine whether the previously detected interference still present therein or the strength of the interference is still identified as being above a pre-defined threshold. If no relevant interference presence or interference signal strength is detected then it is determined by the CCU 14 that the previously disconnected antenna 24, 25, 26, 27 was the source of the interference. If the interference is still detectable then the CCU 14 commands the current AAC (edge) unit 16, 18, 20, 21 to re-connect the associated antenna 24, 25, 26, 27 and the CCU 14 sends an identical disconnect command to the next AAC (edge) unit. The time interval during the disconnection of an antenna is designed to last for an extremely short period in order minimize the effect on the communication channel (for cellular communication this time would not cause disconnection of the call) by the disconnected antenna. When the antenna associated with the interference source is identified a control signal is sent to the CCU 14. In response the CCU 14 initiates a gradual attenuation process via the associated AAC (edge) unit 16, 18, 20, 21. The AAC (edge) unit 16, 18, 20, 21 gradually attenuates the RF cellular signal in order to reduce the interference. Consequent to each attenuation step the signal is re-sampled by the CCU 14. In accordance with the level of interference detection by the CCU 14 the strength of the cellular signal is successively reduced via the operation of a variable attenuator (VVA) or a Digital Controlled Attenuator (DCA) until the detected interference falls below a pre-defined threshold or until the complete disconnection of the antenna. In an alternative embodiment upon the detection of interference by the CCU 14, the CCU 14 disconnects the entire antenna array 24, 25, 26, 27 through commanding the AAC units 16, 18, 20, 21 to disconnect the antennas or attenuate all the antennas to such level where the interference is no longer detected by the CCU 14. Next, the CCU 14 will instruct a first AAC unit 16 to turn on the antenna 24 associated with the said AAC unit or increase the attenuation of the antenna 24 to its normal level or predetermined level of operation. Next, when only a single antenna is operating or operating a normal or predetermined levels and no interference is detected by the CCU 14, the CCU 14 instructs a second AAC unit 18 to turn on or increase the attenuation of antenna 25 to its normal or predetermined level of operation. In this manner the other antennas 26, 27 within the array or structure are turned on or their attenuation is increased via the relative edge units, until such time when the interference is detected. Once interference is detected, the CCU 14 marks the last antenna to be turned on or whose attenuation was increased as the antenna causing the interference. Next, the CCU 14 instructs the relevant AAC unit to either turn the antenna off or attenuate the signal of said antenna until the interference detected is reduced to a predetermined level or disappears. The CCU 14 will then continue with turning on or increasing the attenuation of the other antennas in accordance with the same manner, thus detecting and reducing the interferences within the wireless site.

Figure 2:
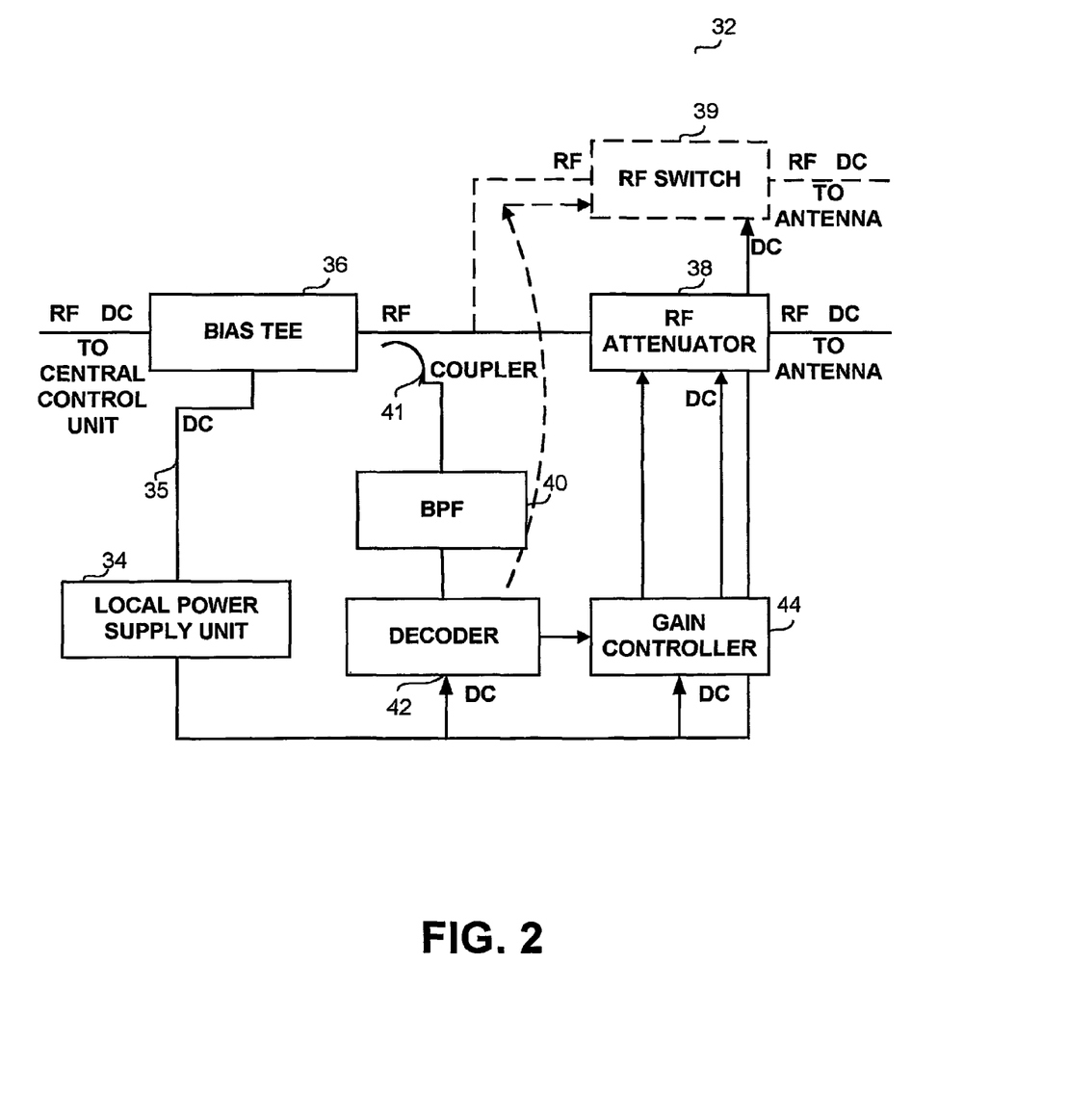
FIG. 2 is a schematic illustration of the edge unit, in accordance with a preferred embodiment of the present invention.

Referring now to FIG. 2 showing a schematic illustration of the edge unit, in accordance with a preferred embodiment of the present invention. The AAC unit or the edge unit 32 consists of a bias tee (or a DC Inserter) 36, a power supply unit 34, a coupler 41, a band pass filter 40, a decoder 42, a gain controller 44, and an RF attenuator 38. Optionally, the unit includes an RF switch 39 for turning the antenna off and on. The bias tee 36 comprises a capacitor and choke (not shown) receives the downlink RF signal and the associated control commands embedded in the signal from the CCU 14 of FIG. 1 through the signal path. The bias tee 36 separates the DC power component from the RF component and feeds the DC power to the power supply unit 34 in order to enable the unit 34 to provide power to the active components of the system, such as the decoder 42, gain controller 44, RF attenuator 38 and optionally, the RF switch. The downlink RF signal separated from the DC power is fed from the bias tee 36 through the signal transmission path directly to the RF attenuator 38 and from there in turn to the associated internal antenna. The downlink RF signal is sampled by the coupler device 41 without degrading or attenuating the RF signal transmitted through the transmission path. The sampled signal is fed through the control path to a band pass filter 40. The filter 40 is a frequency selective circuit, which attenuates the suitable high frequency range of the RF communication signal while maintains the strength of the frequency range of the control command. The control command is fed to the decoder 42 that decodes the control command. The decoded control command is fed to gain controller 44, the output of which in turn controls the operation of the RF attenuator 38. Alternatively, the decoded control command is fed directly to the RF switch 39 instructing the switch to turn on or off the antenna. The attenuator 44 responds to the gain controller's 44 output by either attenuating the uplink RF signal or by increasing the strength of the uplink RF signal. The RF attenuator is capable of processing the RF signal such that a) insignificant attenuation is effected, b) high linearity is provided, and c) the attenuation of the signal is achieved gradually. Thus, in the uplink the RF attenuator 38 feeds the potentially variable strength RF signal back to the bias tee 36 which in turn feeds the RF signal back to the CCU in order to be re-sampled by the CCU for the detection of potential interference.

Figure 3:
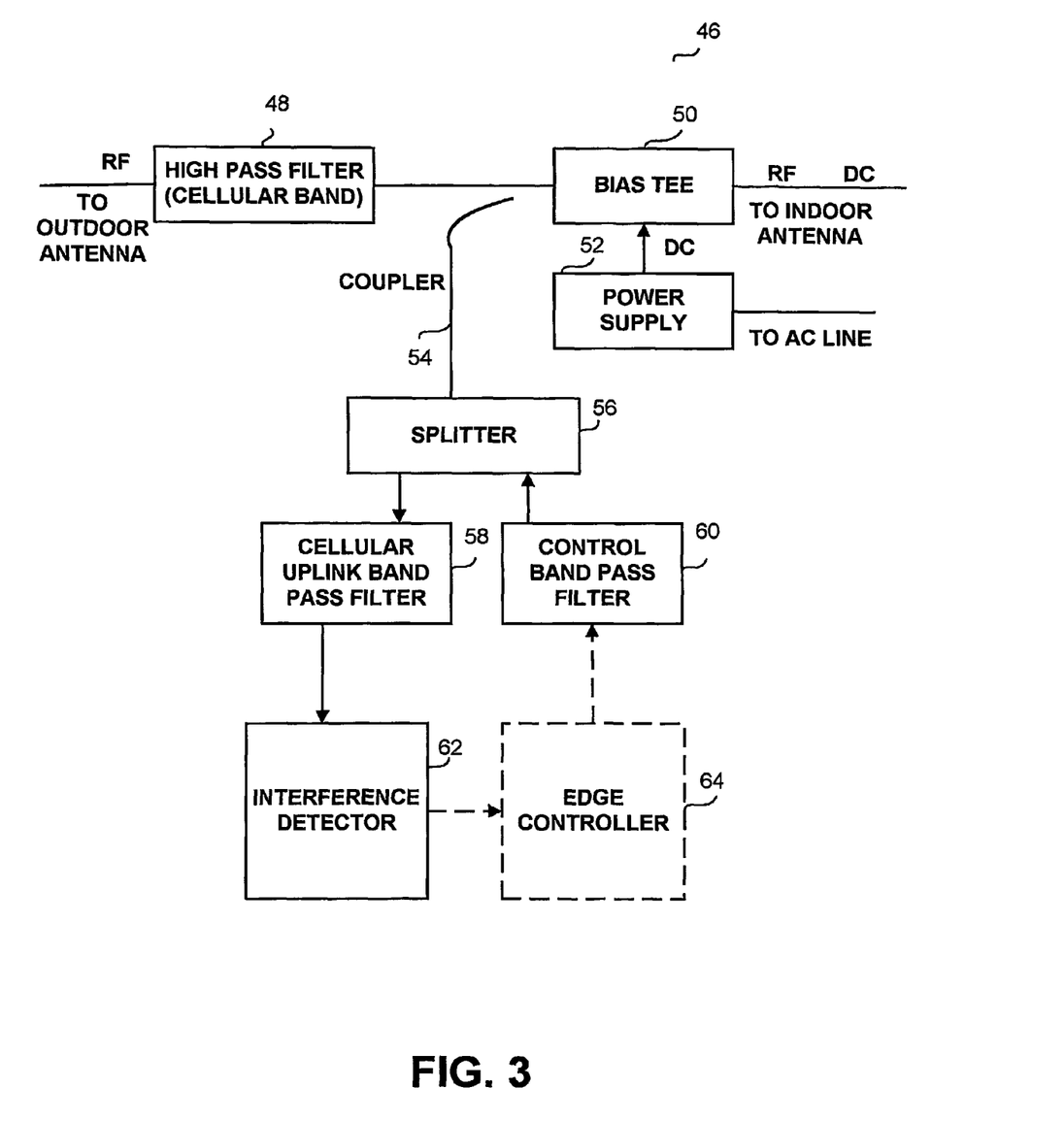
FIG. 3 is a schematic illustration of the central control unit, in accordance with a preferred embodiment of the present invention.

Referring now to FIG. 3 showing a schematic illustration of the Central Control Unit, in accordance with a preferred embodiment of the present invention. The CCU 46 consists of a power supply 52, a bias tee 50, a high pass filter (wireless band) 48, a coupler 54, a splitter unit 56, a cellular uplink band pass filter 58, an interference detector 62, an AAC (edge) controller 64, and a control band pass filter 60. The power supply 52 is fed by a power network and generates DC power for the operation of the CCU and the AAC (edge) units. The bias tee 50 inserts the DC power into the RF signal transmitted to the AAC (edge) units. The high pass filter (HPF) 48 is a frequency selective circuit that blocks the transmission of the control command signals to the external antenna while enabling the transmission of the RF wireless signals only. The coupler circuit 54 provides for the sampling of the communication (cellular) signals transmitted there through without degrading or attenuating the strength thereof. The splitter unit 56 transmits the control command signals through the RF transmission path to the AAC (edge) units and transmits the RF signals to the band pass filter 58. The cellular uplink band pass filter 58 is a frequency selective circuit that filters the cellular signals in the uplink channel. The interference detector 62 is responsible for the detection of the interferences in the uplink channel. The edge controller 64 receives the output of the interference detector 62 concerning the strength of the potential interference and initiates the execution of a method for the changing of the signal amplification from the indoor antennas by the activation of the suitable AAC (edge) units. Optionally, the edge controller 64 is installed within the RBS and the unit 64 is a simple communications controller. Where the edge controller 64 is installed within the RBS the edge controller 64 can be used to detect interferences in relation to a plurality of antennas or repeaters rather than in relation to a single antenna. The control band pass filter 60 is a frequency selective circuit that passes the range of frequencies of the control command signals and feeds the control command signals to the splitter 56 in order to combine the control command signals with the RF signals.

Figure 4:
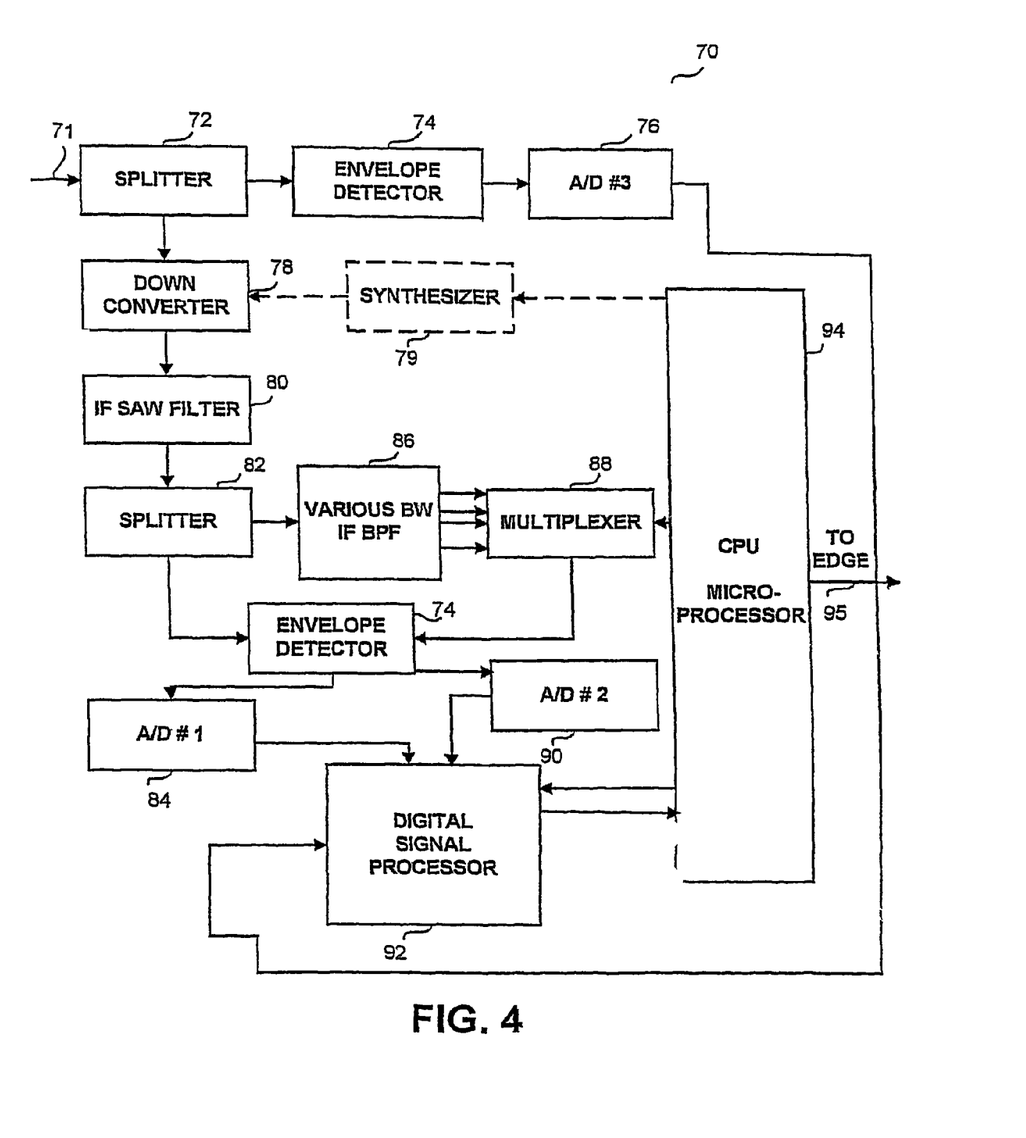
FIG. 4 is a schematic illustration of the interference detection unit, in accordance with a preferred embodiment of the present invention.

Referring now to FIG. 4 showing a schematic illustration of the interference detection unit, in accordance with a preferred embodiment of the present invention. The interference detection unit 70 is responsible for the detection of the interferences in the uplink channel. The unit 70 comprises a first splitter unit 72, a second splitter unit 82, an envelope detector 74, a down converter unit 78, an Intermediate Frequency Surface Acoustic Wave (IF SAW) filter unit 80, a set of various band width Intermediate Frequency (IF) band pass filters (BPF) 86, a multiplexer unit 88, a digital signal processor (DSP) 92, a Central Processor Unit or a micro-processor 94, a first Analog-to-Digital (A/D) converter unit 84, a second Analog-to-Digital (A/D) converter unit 90, and a third Analog-to-Digital (A/D) converter unit 76. The uplink signal 71 is received from a specific antenna via an associated edge unit. The uplink signal is processed by the interference detector unit 70 in order to recognize the potential presence of noise in the signal. The recognition of an interference element in the uplink signal is accomplished by examining the following characteristics of the signal in the uplink channel; a) the strength of the signal relative to a pre-determined interference threshold, b) the stability of the signal or the signal strength along the time axis, c) the spectral structure identified by the examination of the interference envelope at the extremities of the signal and the comparison of the detected envelope to the known structure of cellular signals that should be generated in accordance with the protocols of the known cellular technologies, d) the power level of the signal across pre-defined time slots and the time slot intervals, e) optionally, CDMA, WCDMA would be identified by the correlator of the base sequence of the control channel of the site, f) statistics of uplink levels of known transmissions, such as in the case of CDMA transmissions, can be used for comparing actual uplink levels to detect anomalies and abnormal readings outside the base level determined over the time. In such case, a statistical histogram can be prepared from the normal uplink levels to be used as the basis for comparison. In a non-limiting example, the CDMA uplink levels of a normally functional and operating system can be measured over a period of time of about a week from which data the said histogram can be created. Likewise the various signals received can be separated according to frequency and a second histogram based on the frequency domain over a period of time can be created as an additional or alternative basis for comparison. Furthermore, the spectral characteristics of the uplink transmissions can be measured and saved over a period of time, the results of which can be used to create a spectral histogram forming the basis for comparison against later received signals.

As noted herein above, interference can also be identified according to the length of time between the start and ending of each interference signal detected compared against acceptable intervals during a wireless communication session, such as a telephone conversation or a device to device connection session. For example, it can be stated that wireless communication transmission will not extend beyond 15 minutes at a time within a wireless communication session. Thus, according to the present example, if a single transmission lasts over 15 minutes, or other predetermined length of time, the signal will be determined to be an interfering signal. Some or all of the results from the examinations of interference-specific characteristics of the signal are translated into weighed values that generate a final interference-specific result value. The final result is utilized for determining whether the uplink signal includes an interference element.

Still referring to FIG. 4 the uplink signal from a specific edge device associated with a specific antenna device is divided by the splitter device 72 into two identical signals.

The first signal is fed from the first splitter device 72 to an envelope detector 74 in order to perform spectral analysis and comparison of the interference envelope with the proper signal form. The signal then is fed to the third A/D device 76 in order to be converted to digital format. Subsequently the digital signal is sent to the DSP unit 92 and then to the CPU/micro-processor 94 for appropriate processing. The second signal is fed into a down converter unit 78. The unit 78 down converts the signal into an intermediate frequency. The Intermediate Frequency signal is fed into the IF SAW filter 80 and fed to the second splitter unit 82. The second splitter device 82 divides the IF signal into two similar IF signals. The first IF signal is fed into the envelope detector 74 and then to first A/D unit and consequent to being converted to digital format is sent to the DSP 92 for processing. From the DSP 92 the digital signal is fed to the CPU/micro-processor 94 for appropriate processing. The second IF signal is fed through a set of IF band pass filters 86, multiplexed by the multiplexer 88 and fed to the envelope detector 74 and then to the second A/D unit 90 in order to be converted into digital format. The digital signal is fed to the DSP 92 to be processed. The result of the processing is sent from the DSP 92 to the CPU 94. The results received from the DSP 92 and the A/D 76 are weighed and combined by the CPU 94. In accordance with the determination of the method for interference detection utilized by the CPU 94 the CPU 94 transmits control signals 95 to the edge unit. The control signals 95 are operative in the controlling of the antenna associated with the edge unit. Thus the control signals could represent commands to attenuate the strength of the signal uplink from the antenna, to switch off the antenna, to re-connect antenna and the like.

In order to recognize interference various SAW filters could be used to determine the spectral shape of the sampled signal much in the same manner in which a spectrum analyzer works. The spectral shape is a major characteristic of the noise signal and could be determined through the performance of mathematical operations associated with the DSP, such as the Fourier transform, on the sampled signal. The operation could be further performed by using a down converter and a SAW filter as an energy detector in a specific frequency band. Thus, the down converter determines and generates the appropriate frequency band and feeds the signal to the SAW filter. The envelope energy at the output of the SAW filter is the spectral energy in the specific frequency band.

Figure 5:
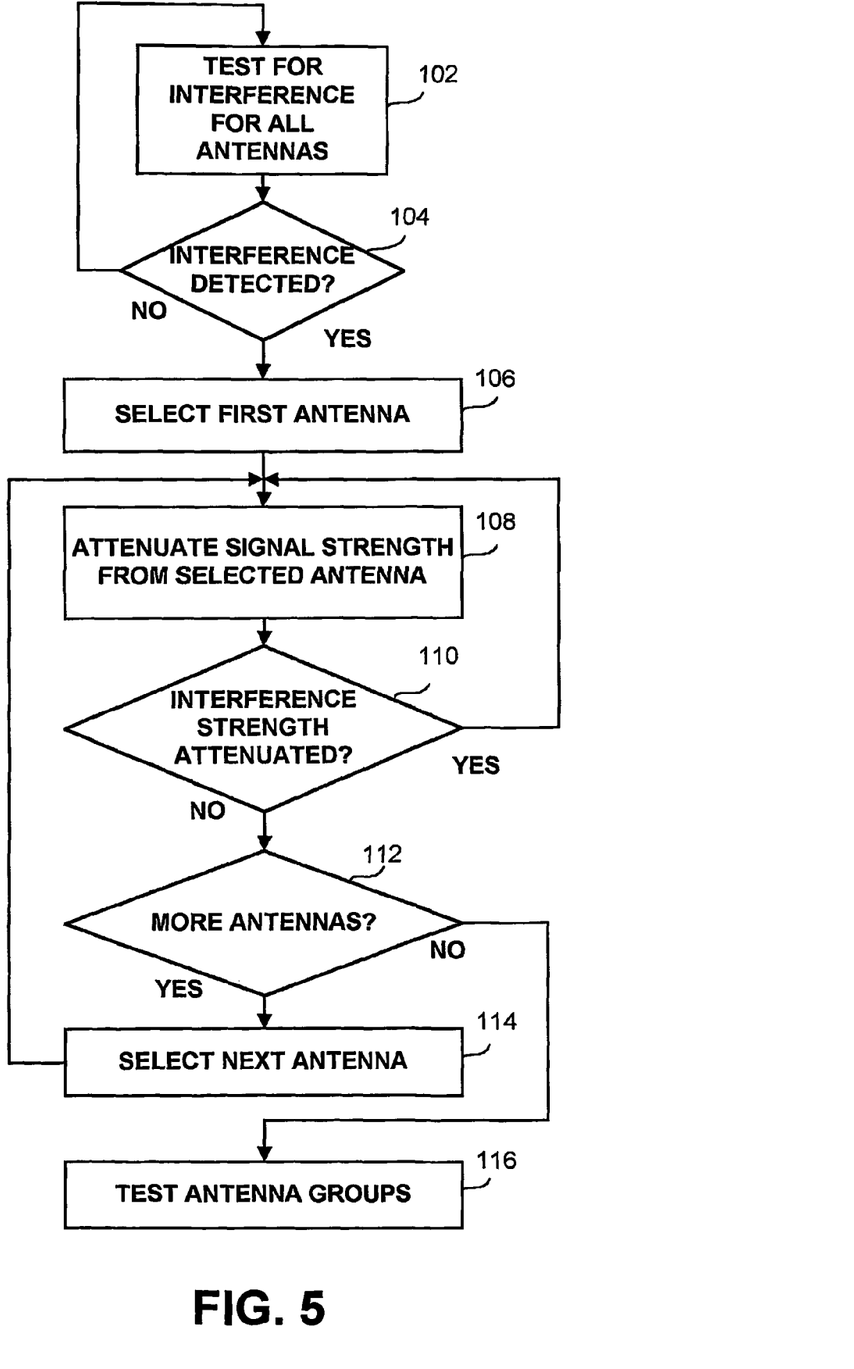
FIG. 5 is a flow chart showing the steps performed following the detection of noise in the uplink combined wireless signal, in accordance with a preferred embodiment of the present invention.

Referring to FIG. 5 showing a flow chart describing the steps performed following the detection of interference in the uplink combined wireless signal, in accordance with a preferred embodiment of the present invention. When the proposed apparatus detects interference in the uplink wireless signal then the following steps are performed. At step 102 a test is performed in order to check for the presence of interference in the combined wireless signal received from the entire set of antennas constituting the indoor network. At step 104 it is determined whether an interference element is present in the combined wireless signal. If the result is negative then further tests are conducted successively and repeatedly or at predetermined times at step 102 in order to detect interference in the combined signal. If the result of step 104 is positive then at step 106 a first antenna is selected from among the antennas constituting the indoor system and at step 108 the signal strength from the selected antenna is attenuated by about 5-25 dB. The attenuation in the signal of the selected antenna can vary depending on the predetermined normal level of signal strength, the type of antenna, the configuration of the indoor system and other like considerations allowing a steady increase in the attenuation so as to allow the detection of the interference. Persons skilled in the art will appreciate that other attenuation level increases can be used in association with this step.

Still referring to FIG. 5 at step 110 it is determined whether following the attenuation of the signal strength from the selected antenna the strength of the interference within the combined signal was reduced by the same attenuation value. If the result is negative then at step 112 it is determined whether there are more antennas to be examined in the indoor network. If the result is positive then at step 114 the next antenna is selected and the steps 108, 110, 112, 114 are repeated for each antenna in the indoor network. If at step 110 it is determined that following the attenuation of the signal strength from the selected antenna the strength of the interference was reduced by the identical attenuation value then the antenna delivering the wireless signal with the interference element is found. Therefore the signal strength of the selected antenna is repeatedly reduced until the interference falls below a pre-determined threshold. Note should be taken that finally the antenna transmitting the interference could be switched off in order to prevent the interference from extending across the indoor network and the associated outdoor network.

Still referring to FIG. 5 if at step 112 it is determined that signal strengths received from all the single antennas in the indoor network were selectively attenuated then it could be assumed that the source of the interference is not in a single antenna. Thus, optionally, at step 116 a pre-determined group of antennas is examined. The group of antennas could include two or more antennas in accordance with the configuration of the indoor network. In order to detect the antennas delivering the wireless signals that include interference elements a group of antennas is selected and the signal strengths received from a selected group of antennas is attenuated by about 5-25 dB. If the strength of the interference in the combined signal is reduced accordingly then the signal strength generated by the selected group of antennas is attenuated until the interference strength falls blow a pre-determined interference threshold. If the interference strength is not reduced following the attenuation of the signal strengths from the selected group of antennas then a next group of antennas is selected and the above-described process is repeated.

If the group of antennas generating the interference is not recognized then the signal strength of the entire set of antennas constituting the indoor network is attenuated until the interference level is reduced below the pre-determined interference threshold. Alternatively, if the interference is not recognized because it no longer exists the entire set of antennas constituting the indoor network is attenuated until the interference level is reduced below the pre-determined interference threshold.

Figure 6:
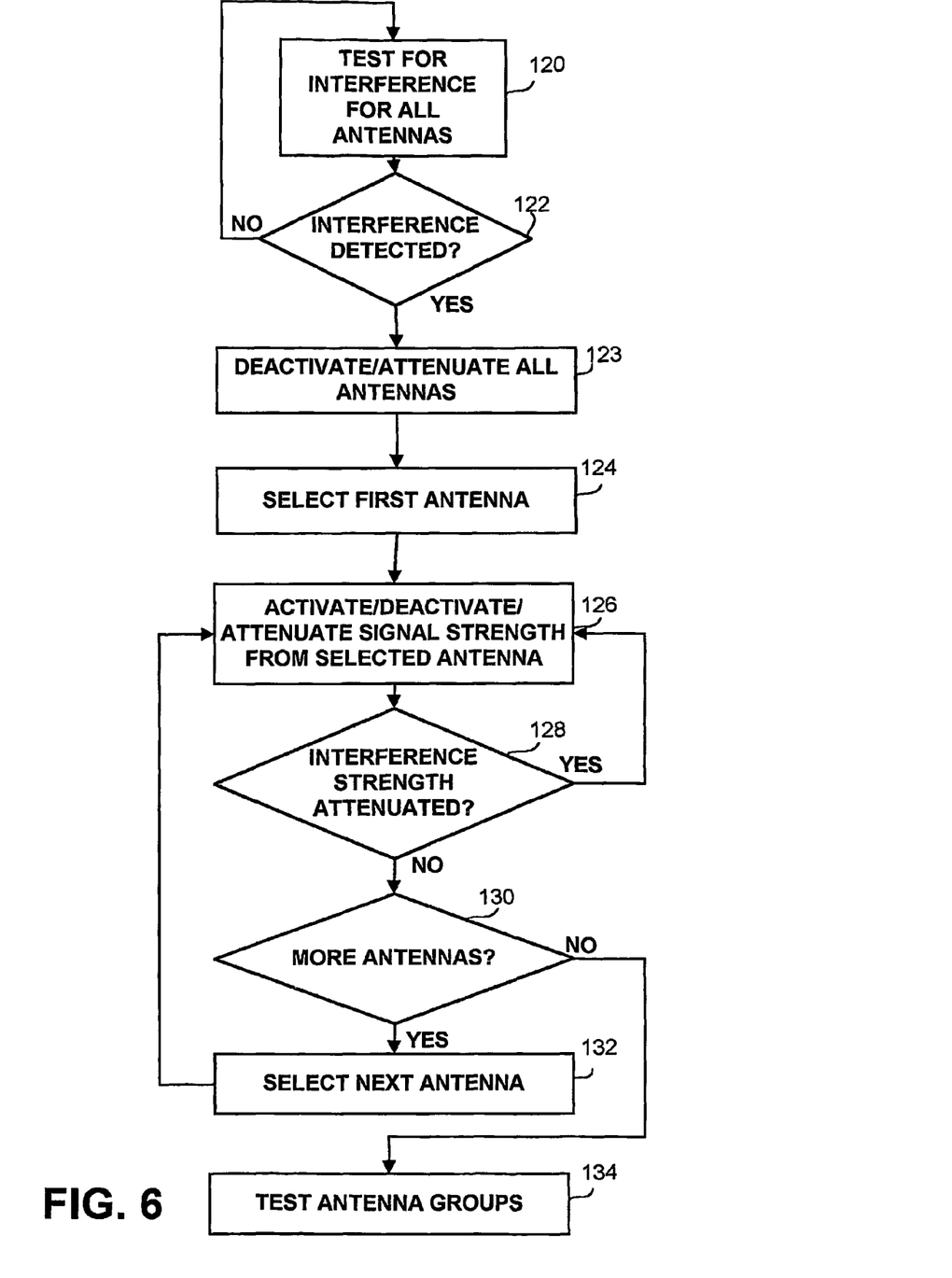
FIG. 6 is a flow chart showing the steps performed following the detection of noise in the uplink combined cellular signal, in accordance with another preferred embodiment of the present invention.

Referring to FIG. 6 shows a flow chart describing the steps performed following the detection of noise in the uplink combined cellular signal, in accordance with another preferred embodiment of the present invention. When the proposed apparatus detects interference in the uplink cellular signal then the following steps are performed. At step 120 a test is performed in order to check for the presence of interference in the combined cellular signal received from the entire set of antennas constituting the indoor network. Contrary to the embodiment described in association with FIG. 5 in the present embodiment the all the antennas of the wireless indoor network are disconnected or attenuated to a lower signal level upon the discovery of interference. Then, each antenna or groups of antennas are attenuated to a higher signal level until the interference is detected. At step 122 the CCU 14 determines whether an interference element is present in the combined wireless signal. If the result is negative then further tests are conducted successively and repeatedly or at predetermined intervals at step 120 in order to detect interference in the combined signal. If the result of step 104 is positive then at step 123 the all the antennas relating to the wireless site or in the indoor system affected are disconnected or are attenuated to a predetermined lower signal level. The attenuation of the signal at this step is designed to reduce the signal level of each antenna such that the combined signal will not include the interference detected, and will allow the detection of the source of the interference and the elimination of the interference. At step 124 a first antenna is selected from among the antennas constituting the indoor system and at step 126 the signal strength from the selected antenna is turned on or attenuated such that the antenna's signal level increases by about 5-25 dB. The attenuation in the signal of the selected antenna can vary depending on the predetermined normal level of signal strength, the type of antenna, the configuration of the indoor system and other like considerations allowing a steady increase in the attenuation so as to allow the detection of the interference. Persons skilled in the art will appreciate that other attenuation level increases can be used in association with this step.

Referring still to FIG. 6 at step 128 it is determined whether following the attenuation of the signal strength from the selected antenna the interference appears within the combined signal. If the result is negative then at step 130 it is determined whether there are more antennas to be examined in the indoor network. If the result is positive then at step 132 the next antenna is selected and the steps 126, 128, 130, 132 are repeated for each antenna in the indoor network. If at step 128 it is determined that following the attenuation of the signal strength the interference was detected then the antenna delivering the cellular signal with the interference element is found. Therefore the signal strength of the selected antenna is reduced until the interference falls below a pre-determined threshold. Note should be taken that finally the antenna transmitting the interference could be switched off in order to prevent the interference from extending across the indoor network and the associated outdoor network.

Still referring to FIG. 6 if at step 130 it is determined that signal strengths received from all the single antennas in the indoor network were selectively attenuated then it could be assumed that the source of the interference is not in a single antenna. Thus, optionally, at step 134 a pre-determined group of antennas is examined. The group of antennas could include two or more antennas in accordance with the configuration of the indoor network. In order to detect the antennas delivering the cellular signals that include interference elements a group of antennas is selected, the entire group of antennas is deactivated or attenuated to a predetermined lower signal level, and then the signal strengths received from a selected group of antennas is attenuated by increasing the signal strength level by about 5-25 dB. The attenuation can be perfumed repeatedly until the normal level of signal strength for the set of antennas is reached. If the strength of the interference in the combined signal is increases accordingly then the signal strength generated by the selected group of antennas is attenuated until the interference strength falls blow a predetermined interference threshold. If the interference strength is not increased following the attenuation of the signal strengths from the selected group of antennas then a next group of antennas is selected and the above-described process is repeated.

If the group of antennas generating the interference is not recognized then the signal strength of the entire set of antennas constituting the indoor network is examined in the same manner as shown in FIG. 6 until the interference level is reduced below the pre-determined interference threshold.

Note should be taken that the proposed apparatus and the method thereof responds to recognized interference elements within the wireless signals distributed in the indoor communication wireless distribution system by dynamically locating the source of the interference, and by preventing the distribution of the interference via the controlled attenuation of the interfering signal. The apparatus and method dynamically controls the potential interference sources by optionally switching off the antennas generating the signal carrying interference elements. Further, the proposed apparatus and method is operative in the reconnection of switched off antennas and/or the controlled restoration of the signal strengths where the interference diminishes.

While reference to signals in this text is made primarily to cellular signal, the person skilled in the art will appreciate that the present invention can be likewise applied to other wireless signals.

It will be appreciated by persons skilled in the art that the present invention is not limited to what has been particularly shown and described hereinabove. Rather the scope of the present invention is defined only by the claims which follow.

We claim:

1. An apparatus serving as an indoor communications wireless distribution system to communicate with wireless communications devices located within an internal space of a structure, the apparatus comprising:
   a radio base station or a repeater device comprising an external antenna and a bidirectional amplifier;
   at least one internally installed antenna device adapted to receive and transmit via the radio base station or repeater device;
   a central control unit interfacing between the radio base station or repeater and the at least one internally installed antenna device for detecting and reducing interference within the indoor wireless network;
   at least one antenna attenuation control unit coupled to a respective at least one internally installed antenna device for interfacing between the at least one internally installed antenna device and the central control unit, and for controlling the attenuation of the at least one internally installed antenna device;
   wherein said central control unit is adapted to identify interference originating from the at least one internally installed antenna device, and to instruct the coupled antenna attenuation control unit to attenuate transmissions from the at least one internally installed antenna device causing the interference; and
   wherein the at least one antenna attenuation control unit further comprises:
   a bias tee or a DC Inserter comprising a capacitor and choke for receiving a signal and associated at least one control command embedded in the signal from the central control unit through a signal path and for further separating a DC power component from an RF component of the signal and feeding the power component to a power supply unit;
   a coupler for sampling the RF component without attenuating the signal;
   a band pass filter for attenuating the frequency range of the RF component while maintaining the frequency range of the at least one control command;
   a decoder for decoding the at least one control commands and feeding the gain controller with the at least one control command;

a gain controller for controlling the operation of the RF attenuator, and;
an RF attenuator for feeding the RF component to the at least one internally installed antenna device.

2. The apparatus of claim 1 wherein the repeater device is a bidirectional amplifier mini-repeater.

3. The apparatus of claim 1 wherein the at least one internally installed antenna device is a multi-band vertical polarization indoor omni-directional antennas.

4. The apparatus of claim 1 further comprising an at least one repeater attached to the at least one antenna attenuation control unit for enhancing the broadcast of the at least one internally installed antenna associated with the at least one antenna attenuation control unit.

5. The apparatus of claim 1 wherein the central control unit is adapted to detect the source antenna of the interference by sampling at least one uplink signal.

6. The apparatus of claim 1 wherein the central control unit is adapted to command the at least one antenna attenuation control unit to attenuate the signal strength received from the associated antenna device.

7. The apparatus of claim 1 wherein the central control unit is adapted to reduce or eliminate the interference by commanding the at least one antenna attenuation control unit to disconnect or lower the level of transmission of the associated at least one internally installed antenna device.

8. The apparatus of claim 1 wherein the central control unit includes a coupler device that is adapted to sample signals without interfering with the transferred signal, thereby identifying the blocking of transmission frequencies or an interference signal that is not a wireless signal.

9. The apparatus of claim 1 wherein the central control unit is adapted to sample signals and identify non-wireless signals generating interference.

10. The apparatus of claim 1 wherein the central control unit is adapted to issue at least one command signal to the at least one antenna attenuation control unit for disconnecting or attenuating the at least one internally installed antenna device.

11. The apparatus of claim 1 further comprising an RF switch for switching off and on the at least one internally installed antenna device.

12. The apparatus of claim 1 wherein the at least one decoded control command is designed to be fed to the RF switch for instructing the switch to switch on or off the antenna device.

13. The apparatus of claim 1 wherein the RF attenuator is adapted to respond to the gain controller output by attenuating the signal or by increasing the strength of the signal.

14. The apparatus of claim 1 wherein the RF attenuator is adapted to feed a variable strength signal back to the bias tee which in turn is adapted to feed the RF signal back to the central control unit for re-sampling by the central control unit for the detection of interference.

15. The apparatus of claim 1 further comprising a power supply unit for feeding power to the components of the at least one antenna attenuation control unit.

16. An apparatus serving as an indoor communications wireless distribution system to communicate with wireless communications devices located within an internal space of a structure, the apparatus comprising:
a radio base station or a repeater device comprising an external antenna and a bidirectional amplifier;
at least one internally installed antenna device adapted to receive and transmit via the radio base station or repeater device;
a central control unit interfacing between the radio base station or repeater and the at least one internally installed antenna device for detecting and reducing interference within the indoor wireless network;
at least one antenna attenuation control unit coupled to a respective at least one internally installed antenna device for interfacing between the respective at least one internally installed antenna device and the central control unit, and for controlling the attenuation of the respective at least one internally installed antenna device;
wherein said central control unit is adapted to identify interference originating from the respective at least one internally installed antenna device, and to instruct the coupled antenna attenuation control unit to attenuate transmissions from the interfering at least one internally installed antenna device causing the interference; and
wherein the central control unit further comprises:
a bias tee for inserting power into the signal transmitted to the at least one antenna attenuation control unit;
a high pass filter comprising a frequency selective circuit for blocking the transmission of at least one control command to the external antenna;
a coupler for sampling the signal without degrading the signal or attenuate the strength of the signal;
a splitter unit for transmitting the at least one control command to the at least one antenna attenuation control unit and wireless signal to a band pass filter;
a wireless band pass filter comprising a frequency selective circuit for filtering the wireless signal;
an interference detector for detecting of interferences;
an antenna attenuation control unit controller for receiving output from the interference detector and activating the at least one antenna attenuation control unit; and
a control band pass filter comprising a frequency selective circuit for passing the at least one control command to the splitter unit for combining the at least one control command with the wireless signal.

17. The apparatus of claim 16 further comprising a power supply fed by a power network and generating power for the operation of the central control unit and the at least one antenna attenuation control unit.

18. The apparatus of claim 16 wherein the antenna attenuation control unit controller is installed within the radio base station for detecting interference in relation to a plurality of antennas or repeaters.

19. An apparatus serving as an indoor communications wireless distribution system to communicate with wireless communications devices located within an internal space of a structure, the apparatus comprising:
a radio base station or a repeater device comprising an external antenna and a bidirectional amplifier;
at least one internally installed antenna device adapted to receive and transmit via the radio base station or repeater device;
a central control unit interfacing between the radio base station or repeater and the at least one internally installed antenna device for detecting and reducing interference within the indoor wireless network;
at least one antenna attenuation control unit coupled to a respective at least one internally installed antenna device for interfacing between the at least one internally installed antenna device and the central control unit, and for controlling the attenuation of the at least one internally installed antenna device;
wherein said central control unit is adapted to identify interference originating from the at least one internally installed antenna device, and to instruct the coupled antenna attenuation control unit to attenuate transmissions from the at least one internally installed antenna device causing the interference; and further comprising an interference detection unit for the detection of interferences in an uplink signal;

wherein the interference detection unit comprises:
at least one splitter unit for splitting an at least one signal into at least two similar signals;
an envelope detector for performing spectral analysis on the at least two similar signals and comparing the interference envelope with a predetermined wireless signal form;
at least one converter unit for converting the at least two similar signals from analogue to digital form,
a down converter unit for converting the at least two similar signals into an intermediate frequency,
a digital signal processor for processing the at least two similar signals in analog form,
a central processor unit for processing the at least two similar signals in digital form and for sending an at least one control command to control the attenuation of the at least one internally installed antenna device.

20. The apparatus of claim 19 further comprising an intermediate frequency surface acoustic wave filter unit adapted to determine spectral energy distribution of a noise signal in a specific frequency band; at least one band width intermediate frequency band pass filter; and a multiplexer unit.

21. The apparatus of claim 19 wherein the central processor unit is adapted to recognize an interference element in the uplink signal by examining the strength of the signal relative to a pre-determined interference threshold.

22. The apparatus of claim 19 wherein the at least one converter is an analog-to-digital converter.

23. The apparatus of claim 19 wherein the central processor unit is adapted to recognize an interference element in the uplink signal by examining the stability of the signal or the signal strength along a time axis.

24. The apparatus of claim 19 wherein the central processor unit is adapted to recognize an interference element in the uplink signal by examining the spectral structure identified by the examination of the interference envelope at the extremities of the signal and the comparison of the detected envelope to the known structure of wireless signal.

25. The apparatus of claim 19 wherein the central processor unit is adapted to recognize an interference element in the uplink signal by examining the power level of the signal across pre-defined time slots and the time slot intervals.

26. The apparatus of claim 19 wherein the central processor unit is adapted to recognize an interference element in the uplink signal by examining the correlator of the base sequence of the control channel of the site.

27. The apparatus of claim 19 wherein the central processor unit is adapted to recognize an interference element in the uplink signal by examining statistics of uplink levels of at least one previously made transmission, compared to actual uplink levels for detecting readings outside the base level determined over the time.

28. The apparatus of claim 19 wherein the central processor unit is adapted to recognize an interference element in the uplink signal by examining the length of time between the start and ending of each interference signal detected.

29. The apparatus of claim 19 wherein the at least one control command provides for the switching off or on of the at least one internally installed antenna device.

* * * * *